US007452211B1

(12) United States Patent
Helsel (10) Patent No.: US 7,452,211 B1
(45) Date of Patent: Nov. 18, 2008

(54) EDUCATIONAL BOX TOY AND METHOD

(76) Inventor: Samuel A. Helsel, 28 Boat St., North Haledon, NJ (US) 07508

( * ) Notice: Subject to any disclaimer, the term of this patent is extended or adjusted under 35 U.S.C. 154(b) by 612 days.

(21) Appl. No.: 11/221,067

(22) Filed: Sep. 7, 2005

(51) Int. Cl.
*G09B 25/00* (2006.01)
(52) U.S. Cl. .................................................. 434/403
(58) Field of Classification Search ................ 434/403, 434/159, 167, 171, 172, 174, 176; 206/45.21, 206/45.22, 45.29, 525.1
See application file for complete search history.

(56) References Cited

U.S. PATENT DOCUMENTS

| | | | |
|---|---|---|---|
| 368,819 A | | 8/1887 | Diemer |
| 550,563 A | * | 11/1895 | Pierce ........................ 434/403 |
| 550,793 A | | 12/1895 | Jefferson |
| 740,451 A | * | 10/1903 | Mansfield .................... 434/403 |
| 3,258,268 A | | 6/1966 | Treinis |
| 4,158,921 A | * | 6/1979 | Stolpen ....................... 434/403 |
| 4,778,392 A | * | 10/1988 | Mitchell ...................... 434/403 |
| 4,965,106 A | | 10/1990 | DeChristopher |
| 5,092,777 A | * | 3/1992 | Crowe ......................... 434/159 |
| 5,306,198 A | * | 4/1994 | Forman ....................... 446/120 |
| 5,554,062 A | * | 9/1996 | Goldsen ...................... 446/124 |
| 5,803,743 A | * | 9/1998 | Kaufman ..................... 434/159 |
| 5,833,465 A | * | 11/1998 | Jarzewiak ................... 434/171 |
| 5,984,755 A | | 11/1999 | Avey |
| 6,152,740 A | * | 11/2000 | Corrado ...................... 434/172 |
| 6,271,453 B1 | | 8/2001 | Hacker |
| 7,011,525 B2 | * | 3/2006 | Mejia .......................... 434/167 |
| 7,018,210 B2 | * | 3/2006 | Goldman et al. ............ 434/172 |

* cited by examiner

*Primary Examiner*—Kurt Fernstrom
(74) *Attorney, Agent, or Firm*—Arthur Jacob (57) ABSTRACT

An educational box toy and method for teaching one or more of the alphabet, numbers, colors, spacial problem solving and hand-eye coordination, utilizes a series of four blanks dimensioned and configured for selective erection by folding into a corresponding series of four box-like members, each box-like member having six faces, and each blank comprising nine panels so that the total number of panels provide a sufficient number of surfaces upon which to display alpha-numeric characters arranged for viewing in alphabetical order and in numerical order during folding of the blanks to erect the box-like members and during unfolding to return to the blanks in desired learning sequences. The series of blanks are shown dimensioned and configured such that each consecutive box-like member of the series is smaller than and receivable within a larger next consecutive box-like member of the series for enabling the box-like members to be assembled into a nested arrangement of box-like members.

38 Claims, 8 Drawing Sheets

EDUCATIONAL BOX TOY AND METHOD

The present invention relates generally to educational toys and the role of such toys in acquiring basic knowledge and learning basic skills. More specifically, the invention pertains to an educational box toy and method for teaching one or more of the alphabet, numbers, colors, spacial problem solving and hand-eye coordination.

Creators of toys have long been occupied with the development of educational toys designed to impart to children basic knowledge and teach children basic skills while providing sufficient entertainment to maintain a child's interest. While these endeavors have led to the development of many cleverly constructed educational toys, experience has shown that children respond most favorably to simple devices having uncomplicated constructions which allow a child to exercise his or her own imagination without having to cope with intricate or complex arrangements set up by sophisticated designers.

Very often, children have been observed to find greater interest and entertainment in playing with boxes in which a toy is packaged than in the toy itself. The present invention takes advantage of that observation and provides a child with simple box-like structures which can be manipulated readily by a child while the child acquires basic knowledge and learns basic skills. As such, the present invention attains several objects and advantages, some of which are summarized as follows: Provides a box-like toy having a simple construction which is highly effective in imparting to children basic knowledge and teaching children basic skills; encourages children to use their own imagination in manipulating a structural arrangement of minimal complexity to derive information and skills; maintains a child's interest while the child gains basic information and skills; caters to a child's fascination with simple structures to impart knowledge and skills through ready manipulation of such simple structures; provides an educational toy of simple design and construction, readily manufactured of relatively inexpensive materials for economy and widespread acceptance and use.

The above objects and advantages, as well as still further objects and advantages, are attained by the present invention which may be described briefly as an educational box toy and methods for teaching one or more of the alphabet, numbers, colors, spacial problem solving and hand-eye coordination, the box toy comprising: a series of blanks constructed of sheet material, the blanks being dimensioned and configured for selective erection by folding into a corresponding series of box-like members, each box-like member having six faces, each blank comprising nine panels, including: four first panels aligned along a longitudinal row having longitudinally opposite ends, the first panels including an end panels, with an end panel adjacent each end of the row, intermediate panels between the end panels, a bottom edge, a top edge laterally opposite the bottom edge, and first fold lines between corresponding adjacent first panels for enabling folding of the first panels into corresponding four sides of a corresponding box-like member; a first additional panel extending from one of the first panels, and a first additional fold line between the first additional panel and the one first panel for enabling folding of the first additional panel into overlapping juxtaposition with a first panel; a second panel extending in a first lateral direction from the bottom edge of the longitudinal row of first panels, adjacent a first panel, and a second fold line between the second panel and the adjacent first panel for enabling folding of the second panel into a bottom of the corresponding box-like member; a second additional panel extending in the first lateral direction from the bottom edge of the longitudinal row of first panels, adjacent a first panel, and a second additional fold line between the second additional panel and the adjacent a first panel for enabling folding of the second additional panel into overlapping juxtaposition with the second panel; a securing arrangement for securing the second additional panel in the overlapping juxtaposition with the second panel; a third panel extending in a second lateral direction, opposite to the first lateral direction, from the top edge of the longitudinal row of first panels, adjacent a first panel, and a third fold line between the third panel and the adjacent first panel for enabling folding of the third panel into a top of the corresponding box-like member; a third additional panel extending in the second lateral direction, opposite to the first lateral direction, from the top edge of the longitudinal row of first panels, adjacent a first panel, and a third additional fold line between the third additional panel and the adjacent a first panel for enabling folding of the third additional panel into overlapping juxtaposition with the third panel; and a further securing arrangement for securing the third additional panel in the overlapping juxtaposition with the third panel; the series of blanks being dimensioned and configured such that each consecutive box-like member of the series of box-like members is smaller than and receivable within a larger next consecutive box-like member of the series of box-like members for enabling the box-like members of the series to be assembled into a nested arrangement of box-like members, and the methods comprising folding and unfolding the panels in prescribed sequences, and assembling the box-like members in the nested arrangement.

In addition, the invention includes an educational box toy and methods for teaching basic knowledge and skills, the box toy comprising: a blank constructed of sheet material, the blank being dimensioned and configured for selective erection by folding into a corresponding box-like member having six faces, the blank comprising nine panels, including: four first panels aligned along a longitudinal row having longitudinally opposite ends, the first panels including end panels, with an end panel adjacent each end of the row, intermediate panels between the end panels, a bottom edge, a top edge laterally opposite the top edge, and first fold lines between corresponding adjacent first panels for enabling folding of the first panels into corresponding four sides of a corresponding box-like member; a first additional panel extending from one of the first panels, and a first additional fold line between the first additional panel and the one first panel for enabling folding of the first additional panel into overlapping juxtaposition with a first panel; a second panel extending in a first lateral direction from the bottom edge of the longitudinal row of first panels, adjacent a first panel, and a second fold line between the second panel and the adjacent first panel for enabling folding of the second panel into a bottom of the corresponding box-like member; a second additional panel extending in the first lateral direction from the bottom edge of the longitudinal row of first panels, adjacent another first panel, and a second additional fold line between the second additional panel and the adjacent another first panel for enabling folding of the second additional panel into overlapping juxtaposition with the second panel; a securing arrangement for securing the second additional panel in the overlapping juxtaposition with the second panel; a third panel extending in a second lateral direction, opposite to the first lateral direction, from the top edge of the longitudinal row of first panels, adjacent a first panel, and a third fold line between the third panel and the adjacent first panel for enabling folding of the third panel into a top of the corresponding box-like member; a third additional panel extending in the second lateral direction, opposite to the first lateral direction, from the top edge of the longitudinal row of first panels, adjacent a first panel, and a third additional fold line between the third additional panel and the adjacent first panel for enabling folding of the third additional panel into overlapping juxtaposition with the third panel; and a further securing arrangement for securing the third additional panel in the overlapping juxtaposition with the third panel, and the methods comprising folding and unfolding the panels in prescribed sequences.

The invention will be understood more fully, while still further objects and advantages will become apparent, in the following detailed description of preferred embodiments of the invention illustrated in the accompanying drawing, in which.

Figure 1:
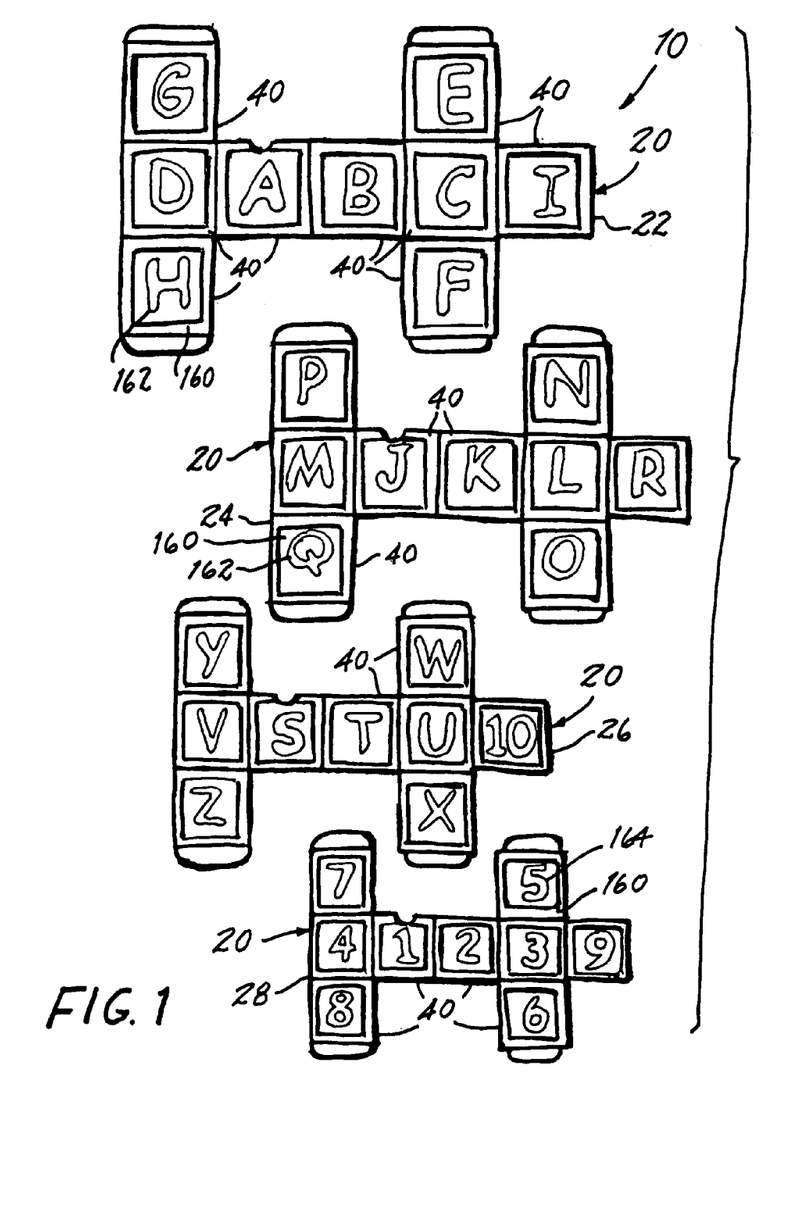
FIG. 1 is a plan view of a series of blanks which make up an educational toy constructed and manipulated in accordance with the present invention.

Referring now to the drawing, and especially to FIG. 1 thereof, an educational box-toy constructed in accordance with the present invention is shown generally at 10 and is seen to include a series of four blanks 20 in the form of blank 22, blank 24, blank 26 and blank 28. Each blank 20 is constructed of a relatively inexpensive sheet material, such as paperboard or a synthetic polymeric material, having a thickness which is conventional in the manufacture of paperboard boxes. Blanks 20 are dimensioned and configured for selective erection by folding into a corresponding series of box-like members 30, shown in FIG. 2 in the form of member 32, erected from blank 22, member 34 erected from blank 24, member 36 erected from blank 26 and member 38 erected from blank 28. Each blank 20 is essentially flat and has nine panels 40, and each box-like member 30 is in the form of a cube having six essentially square faces 50, including four side faces 52, a bottom face 54 and a top face 56.

Figure 2:
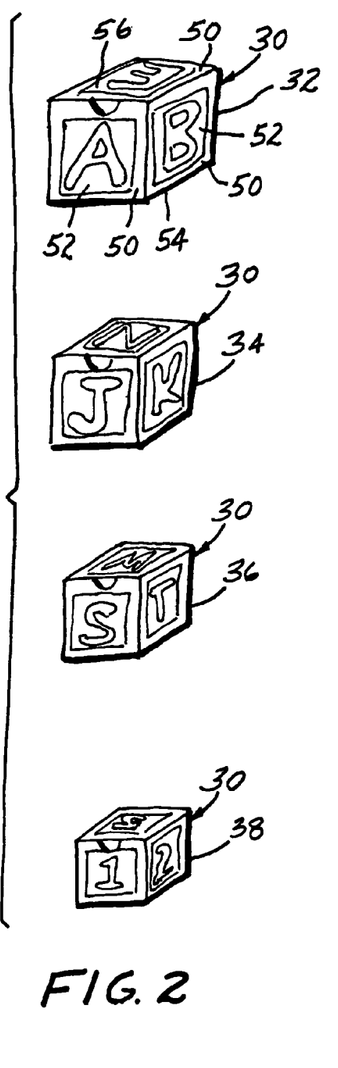
FIG. 2 is a pictorial perspective view of a corresponding series of box-like members erected from the blanks shown in FIG. 1.
Figures 3, 4:
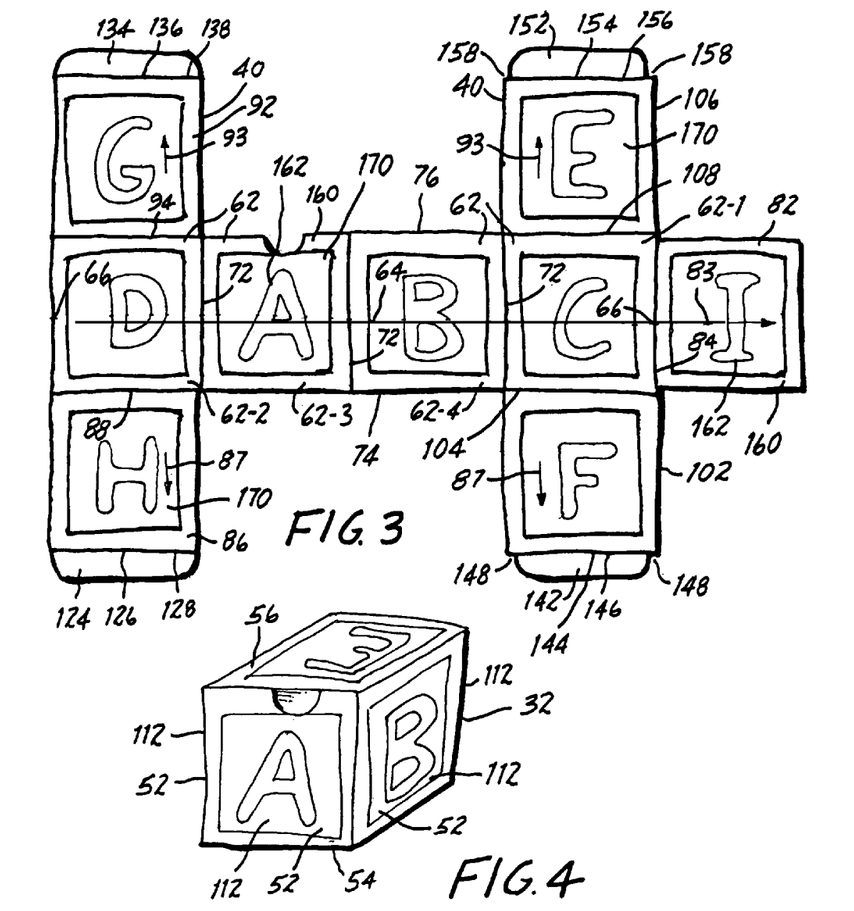
FIG. 3 is an enlarged plan view of one blank.
FIG. 4 is pictorial perspective view of a box-like member erected from the blank of FIG. 3, in accordance with the present invention.

Looking first at blank 22, and corresponding box-like member 32, as seen in FIGS. 3 and 4, as well as in FIGS. 1 and 2, the nine panels 40 include four first panels 62 aligned along a longitudinal row 64 having longitudinally opposite ends 66, the first panels 62 including an end panel 62-1 at one of the opposite ends 66 and another end panel 62-2 at the other of the opposite ends 66 of the row 64. Intermediate panels 62-3 and 62-4 are located along row 64 between end panels 62-1 and 62-2. First fold lines 72 are located between corresponding adjacent first panels 62, and the longitudinal row 64 includes a bottom edge 74 and a top edge 76 laterally opposite the bottom edge 74.

A first additional panel 82 extends in a longitudinal direction 83 from one of the end panels 62-1 and 62-2, here shown as end panel 62-1, and a first additional fold line 84 is located between the first additional panel 82 and the one end panel 62-1. A second panel 86 extends in a first lateral direction 87 from the bottom edge 74 of the row 64, adjacent another first panel 62, here shown as end panel 62-2, and a second fold line 88 is located between second panel 86 and end panel 62-2. A third panel 92 extends in a second lateral direction 93, opposite to the first lateral direction 83, from the top edge 76 of the row 64, adjacent a first panel 62, here shown as end panel 62-2, and a third fold line 94 is located between the third panel 92 and the end panel 62-2. Thus, in the illustrated embodiment, the second panel 86 and the third panel 92 both extend from the common end panel 62-2.

A second additional panel 102 extends in the first lateral direction 87 from the bottom edge 74 of the row 64, adjacent the one first panel 62, here shown as end panel 62-1, and a second additional fold line 104 is located between second additional panel 102 and end panel 62-1. A third additional panel 106 extends in the second lateral direction 93, opposite to the first lateral direction 87, from the top edge 76 of the row 64, adjacent the one first panel 62, here shown as end panel 62-1, and a third additional fold line 108 is located between the third additional panel 106 and the end panel 62-1. Thus, first additional panel 82, second additional panel 102 and third additional panel 106 all extend from the common end panel 62-1.

Figures 5, 6:
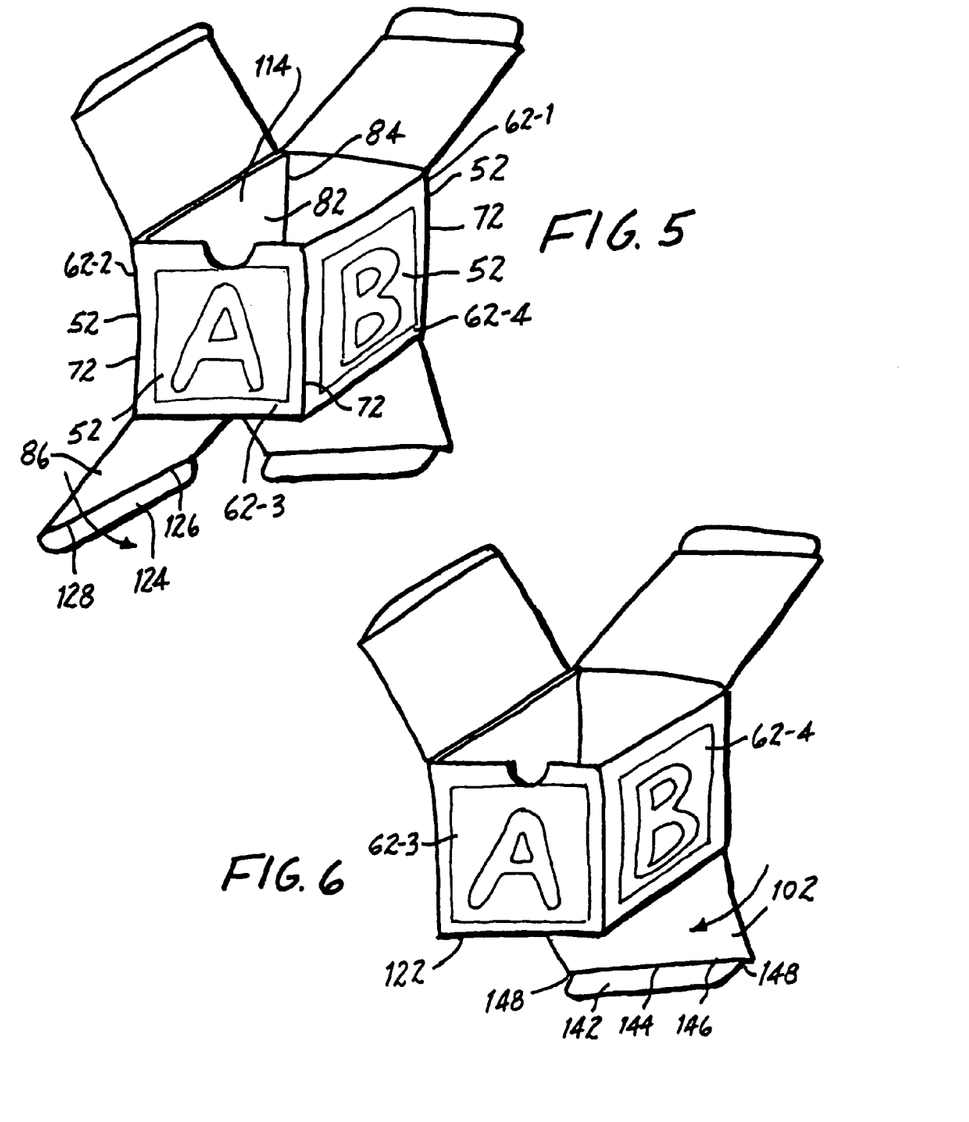
FIGS. 5 through 8 are somewhat diagrammatic pictorial views showing a sequence of manipulations in the erection of the box-like member of FIG. 4 from the corresponding blank of FIG. 3, in accordance with the present invention.

Blank 22 is erected readily into box-like member 32. With reference to FIG. 5, in a first step first panels 62 are folded about first fold lines 72 to place adjacent first panels 62 at right angles to one another, thereby establishing four sides 112 bearing side faces 52 of box-like member 32. At the same time, first additional panel 82 is folded about fold line 84 into overlapping juxtaposition with end panel 62-2, inside the enclosure 114 formed by the first panels 62, all as illustrated in FIG. 5. In a subsequent step, second panel 86 is folded about second fold line 88, in the direction shown in FIG. 5, to establish a bottom 122 of member 32. A bottom tab 124 is folded about a bottom tab fold line 126 which runs along an outer edge 128 of second panel 86 so that bottom tab 124 is tucked within the enclosure 114 to close the bottom 122 of member 32 and hold the second panel 86 in place, as seen in FIG. 6.

Figures 7, 8, 10:
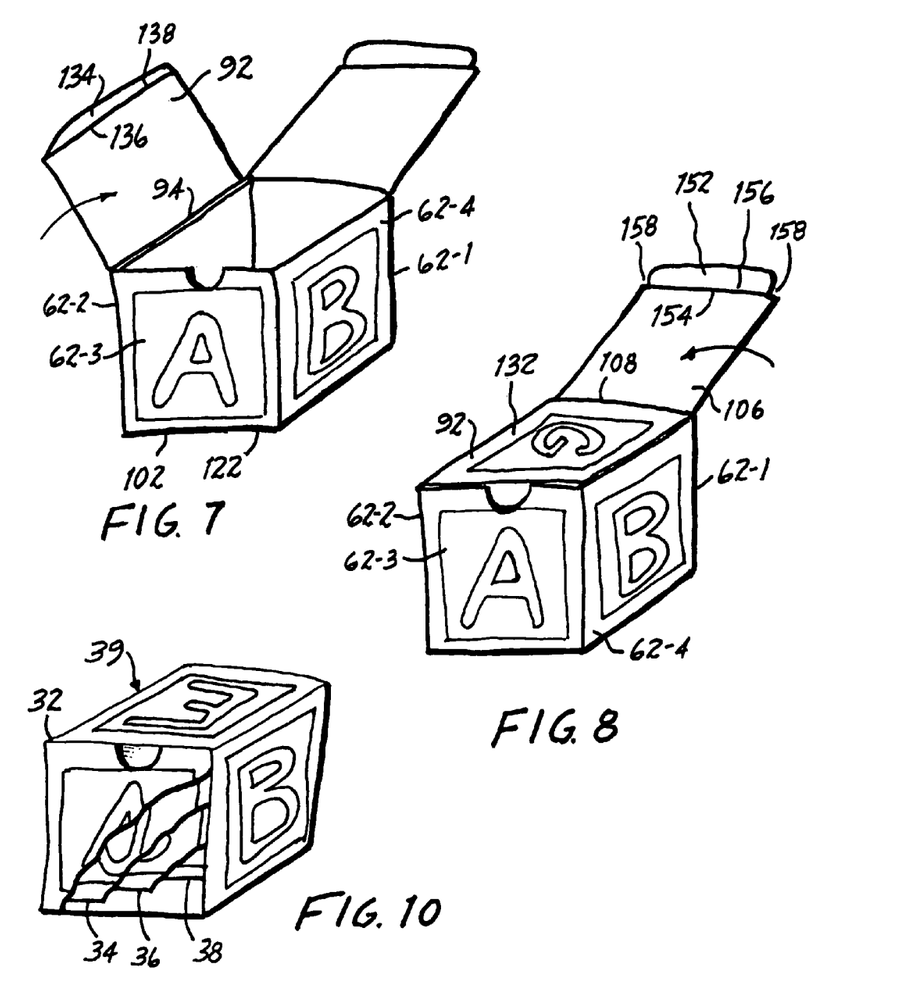
FIG. 10 is a pictorial perspective view of the assembled integrated single unit.

Then, second additional panel 102 is folded about second additional fold line 104, in the direction shown in FIG. 6, to bring the second additional panel 102 into overlapping juxtaposition with second panel 86, as illustrated by the position of panel 102 shown in FIG. 7. At the same time, an additional bottom tab 142 is folded about an additional bottom tab fold line 144, which runs along an outer edge 146 of second additional panel 102, so that additional bottom tab 142 is tucked within the enclosure 114, between bottom 122 and adjacent panel 62-3, to comprise a securing arrangement for securing the second additional panel 102 in overlapping juxtaposition with second panel 86 and complete the closing of the member 32 at bottom face 54. A clearance space 148 located at each end of additional bottom tab 142 facilitates insertion of additional bottom tab 142 between bottom 122 and adjacent panel 62-3, with additional bottom tab 142 extending between opposite panels 62-2 and 62-4.

Subsequently, third panel 92 is folded about third fold line 94, in the direction illustrated in FIG. 7, to establish a top 132 of member 32, as shown in FIG. 8. A top tab 134 is folded about a top tab fold line 136 which runs along an outer edge 138 of third panel 92 so that top tab 134 is tucked within the enclosure 114 to close the top 132 of member 32, as seen in FIG. 8, and hold the third panel 92 in place. Then, third additional panel 106 is folded about third additional fold line 108, in the direction illustrated in FIG. 8, to bring the third additional panel 106 into overlapping juxtaposition with top 132 established by third panel 92. At the same time, an additional top tab 152 is folded about an additional top tab fold line 154, which runs along an outer edge 156 of third additional panel 106, so that additional top tab 152 is tucked within the enclosure 114, between top 132 and adjacent panel 62-3, to comprise a securing arrangement for securing the third additional panel 106 in overlapping juxtaposition with third panel 92 and complete the closing of member 32 at the top face 56, as shown in FIG. 4. A clearance space 158 located at each end of additional top tab 152 facilitates insertion of additional top tab 152 between top 132 and adjacent panel 62-3, with additional top tab 152 extending between opposite panels 62-2 and 62-4. With the additional bottom tab 142 in place, the four sides 112 are held in place in an open configuration, as seen in FIG. 7, for purposes to be set forth below. Once the additional top tab 152 is in place, the integrity of the fully erected box-like member 32, as shown in FIG. 4, is maintained.

Each blank 24, 26 and 28 is constructed similar to blank 22 and is erected into a corresponding box-like member 34, 36 and 38 in the same manner as described above in connection with blank 22, following the same order of folding steps. Accordingly, corresponding component parts of each of blanks 24, 26 and 28, though having different dimensions, are similar and some of these similar component parts have been labeled with the same reference characters. Likewise, the box-like members 34, 36 and 38, while being of different dimensions, are similar to box-like member 32 and corresponding component parts are labeled with the same reference characters.

Figure 9:
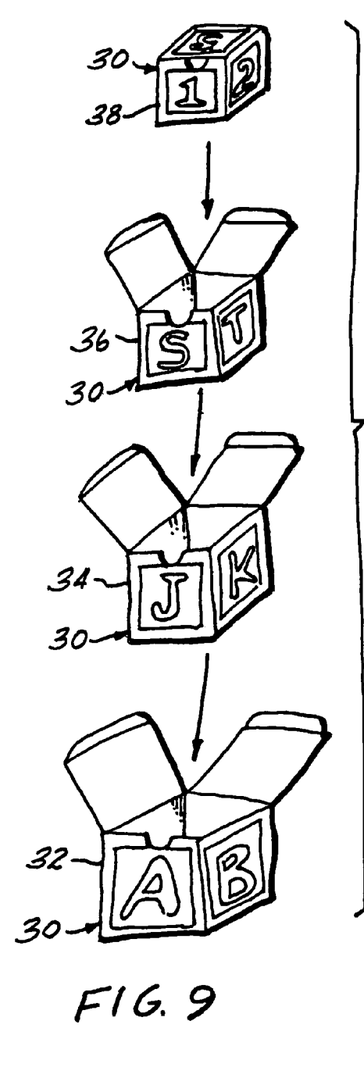
FIG. 9 is a somewhat diagrammatic pictorial illustration of the box-like members being assembled into a single integrated unit of nested box-like members.

The series of blanks 20 illustrated as blanks 22, 24, 26 and 28, are dimensioned and configured such that each consecutive box-like member 34, 36 and 38 of the series of box-like members 30 is smaller than and is receivable within a larger next consecutive box-like member 32, 34 or 36 of the series of box-like members 30, thereby enabling the box-like members 30 of the series to be assembled, as indicated in FIG. 9, into a nested arrangement of box-like members 32, 34, 36 and 38, as illustrated in FIG. 10. Thus, with the smallest member 38 fully erected and the next larger member 36 open at the top, the member 38 is fitted into the next larger member 36; the member 36, within which member 38 resides, is then closed and fitted into the open next larger member 34; and with the member 34 closed, the thus nested members 38, 36 and 34 are fitted into the open largest member 32 which is then closed to complete the nesting of all members 30 into a single integrated unit 39, shown in FIG. 10. In a preferred embodiment, member 38 is in the form of a three inch cube for fitting into member 36, which is in the form of a three and one-half inch cube. The thus assembled members 38 and 36 then are placed within member 34, a four inch cube, and the assembled members 38, 36 and 34 are fitted into the largest member 32, which is in the form of a four and one-half inch cube.

Returning now to FIG. 1, the four blanks 22, 24, 26 and 28 of the series of blanks 20 provide a total of thirty-six panels 40, each blank 20 including nine panels 40. By assigning one alpha-numeric character to each panel 40, the thirty-six panels 40 of the series of four blanks 20 accommodate the twenty-six characters of the English alphabet and the numerical characters "1" through "10". With reference to FIG. 3, as well as to FIG. 2, each panel 40 has an outer surface 160 upon which there is displayed either a letter 162 of the alphabet or a number 164. In the preferred embodiments of the present invention, the letters 162 and the numbers 164 are arranged for viewing in a desired learning sequence. In the learning sequence provided by the embodiment illustrated in FIG. 1, the letters 162 and numbers 164 are arranged so that upon erection of the blanks 20 into the corresponding members 30, those letters 162 visible on the six faces 50 of each member 32, 34 and 36 can be read in alphabetical order, and those numbers 164 visible on the six faces 50 of member 38 can be read in numerical order. Folding the panels 40 in a sequence which will achieve the aforesaid arrangement of letters 162 and numbers 164 becomes a learning experience which teaches not only alphabetical order and numerical order, but becomes a lesson in spacial problem solving and training in hand-eye coordination.

Figure 11:
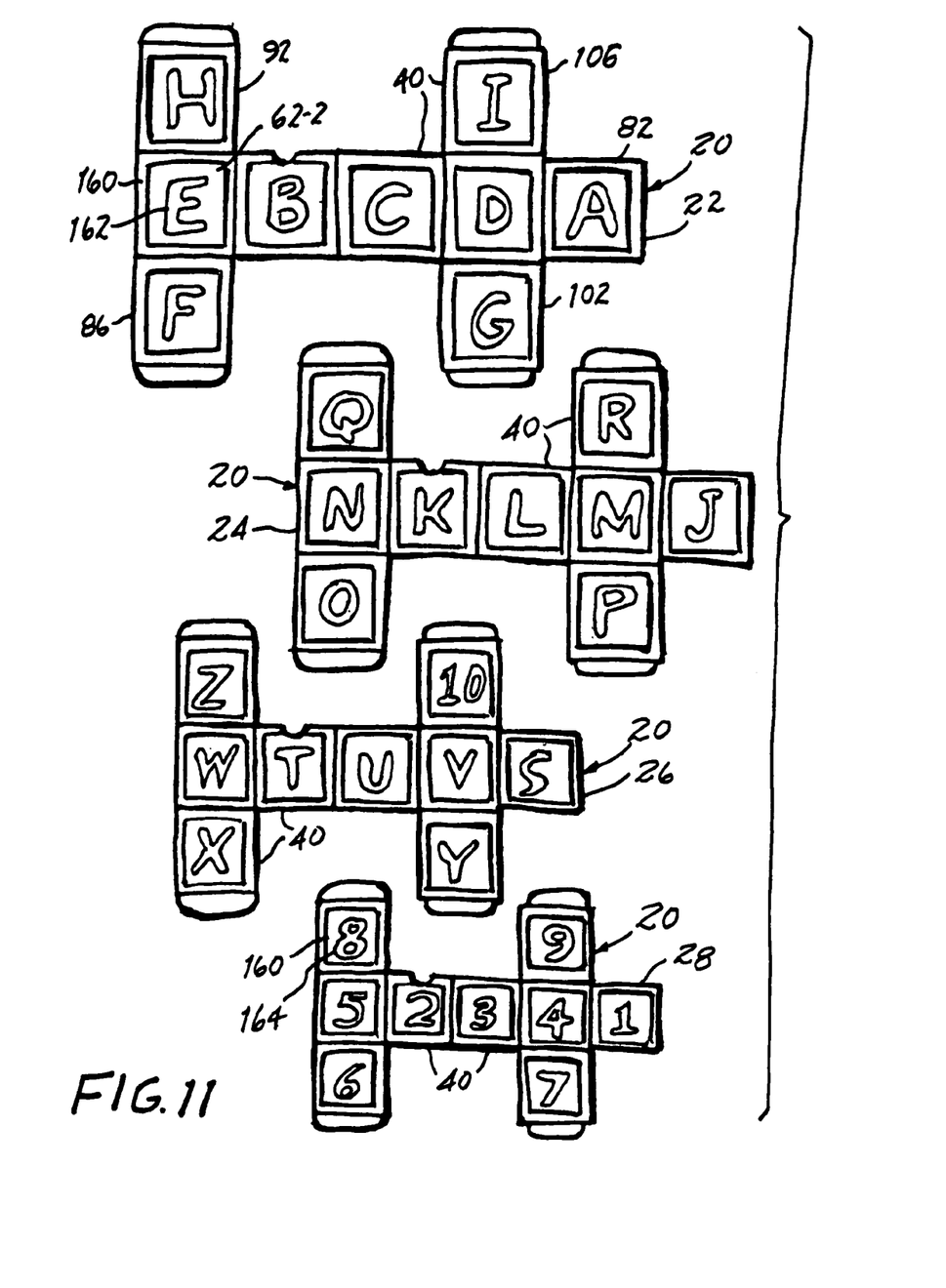
FIG. 11 is a plan view similar to FIG. 1 and showing another embodiment of the present invention.

Turning to the embodiment illustrated in FIG. 11, the letters 162 and the numbers 164 have been arranged on outer surfaces 160 so that each blank 20 is erected into a corresponding box-like member by folding the panels 40 of the blank in a sequence which follows a predetermined standard alphabetical or numerical sequence. Thus, blank 22 is erected into a corresponding member 32 (as described above) by first folding first additional panel 82, which here bears the letter "A", into overlapping juxtaposition with end panel 62-2, which here bears the letter "E", while folding the remaining panels 62, bearing letters "B", "C" and "D", into the four sides of a corresponding box-like member so that the corresponding side faces can be read in alphabetical order "B", "C", "D" and "E". Following the alphabetical sequence, the second panel 86, which here bears the letter "F", is folded to establish a bottom, and the second additional panel 102, which here bears the letter "G", is folded into overlapping juxtaposition with the bottom to complete a bottom face of the corresponding box-like member. Then, the third panel 92, which here bears the letter "H", is folded to establish the top of the corresponding box-like member, and the additional top panel 106, which here bears the letter "I", is folded into overlapping juxtaposition with the top to complete the top face of the corresponding box-like member. The panels 40 of each blank 24, 26 and 28 are folded in a similar sequence in order to erect box-like members corresponding to previously-described box-like members 34, 36 and 38. Folding the panels 40 in the aforesaid sequence reinforces the learning of alphabetical order and numerical order, while teaching spacial relations and training hand-eye coordination.

Figure 12:
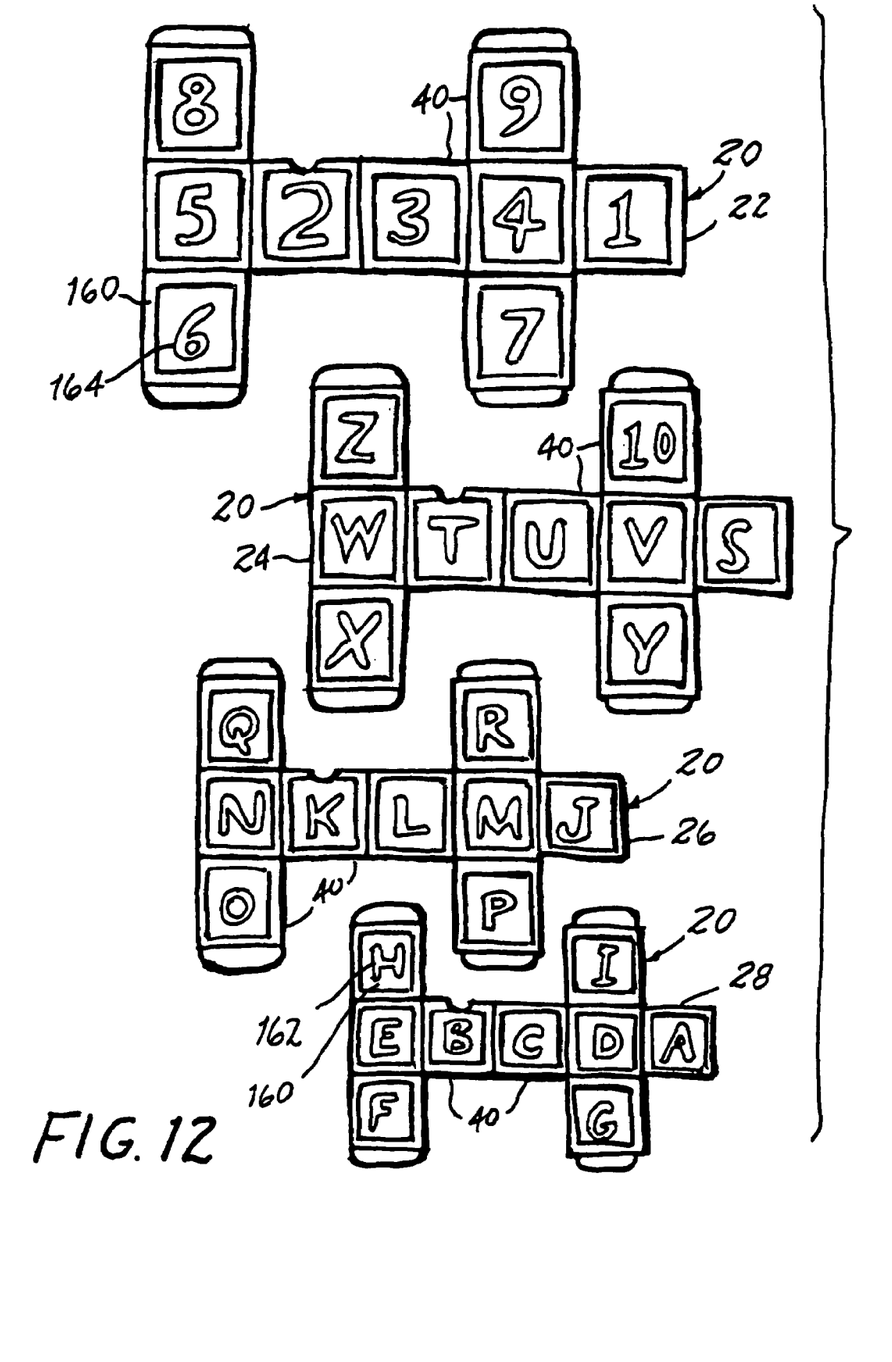
FIG. 12 is a plan view similar to FIG. 1 and showing still another embodiment of the present invention.

Turning now to the embodiment illustrated in FIG. 12, the placement of each smaller box-like member into a next larger box-like member to assemble the members into the nested construction which forms a single unit corresponding to the single unit 39, as illustrated in FIGS. 9 and 10, assists in spacial problem solving. Further lessons in spacial problem solving and hand-eye coordination can be attained by placing the letters "A" through "I" on the smallest blank 28, followed by the letters "J" through "R" on the next larger blank 26, the letters "S" through "Z" and the number "10" on the next larger blank 24, and the numbers "1" through "9" on the largest blank 22. Erecting the box-like members in a sequence which follows a standard alphabetical order and numerical order, the first-erected box-like member, corresponding to member 38, being the smallest member 30, can be fitted into the next-erected box-like member, corresponding to member 36, as member 36 is being erected; the nested box-like members, corresponding to members 38 and 36, can be fitted into the next-erected box-like member, corresponding to member 34, as member 34 is being erected; and then the nested box-like members corresponding to members 38, 36 and 34 can be fitted into the next-erected box-like member, corresponding to member 32, as member 32 is being erected, thereby providing simultaneous lessons in spacial problem solving and hand-eye coordination while reinforcing alphabetical and numerical skills.

Figure 13:
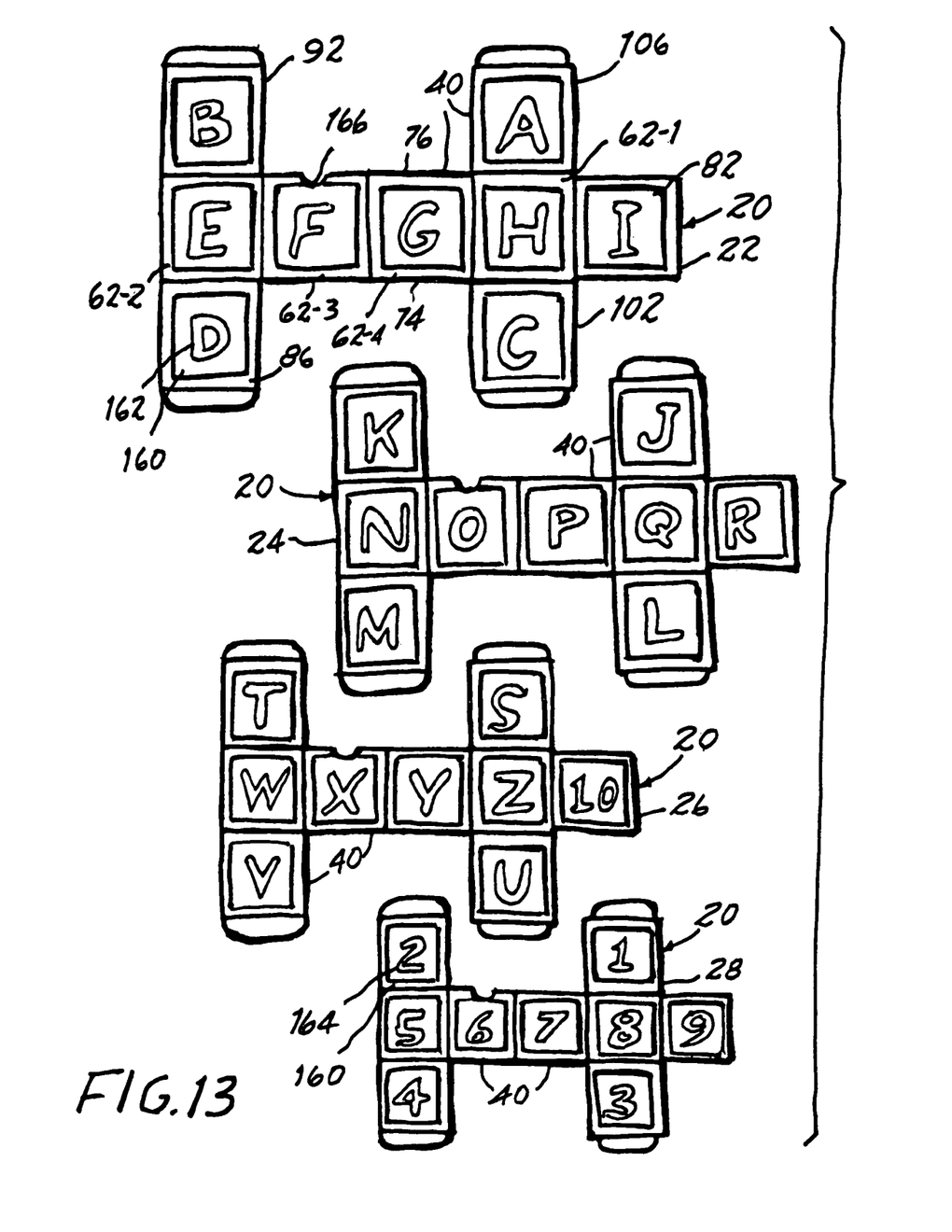
FIG. 13 is a plan view similar to FIG. 1 and showing yet another embodiment of the present invention.

In the embodiment illustrated in FIG. 13, the letters 162 and the numbers 164 have been arranged on surfaces 160 so that each box-like member can be unfolded into a corresponding blank 20 by unfolding the panels 40 of the blank in a sequence which follows a predetermined standard alphabetical or numerical sequence. Thus, a box-like member corresponding to member 32 originally erected from a corresponding blank 22, lettered as illustrated in FIG. 13, can be unfolded into corresponding blank 22 by first unfolding third additional panel 106, which here bears the letter "A", from overlapping juxtaposition with third panel 92, which here bears the letter "B". A notch 166 is placed along the top edge 76 so as to be located adjacent additional top tab 152 in an erected box-like member to facilitate unfolding of additional top panel 106. Similarly, a notch 166 is placed in each blank 20 to facilitate unfolding of a corresponding box-like member 30. Then third panel 92, which here bears the letter "B", is unfolded to complete the opening of the top of the box-like member corresponding to member 32. Following the alphabetical sequence, the second additional panel 102, which here bears the letter "C", and the second panel 86, which here bears the letter "D", are unfolded. The remaining panels 62-1, 62-2, 62-3, 62-4 and 82, here bearing letters "E" through "I", are unfolded to complete the unfolding process and arrive at a flat blank 22. The panels 40 of each box-like member corresponding to members 34, 36 and 38 are unfolded in a similar sequence in order to return to corresponding flat blanks 24, 26 and 28. Unfolding the panels 40 in the aforesaid sequence reinforces the learning of alphabetical order and numerical order, while teaching spacial relations and hand-eye coordination.

In any of the illustrated embodiments, each of the surfaces 160 may be provided with a field of color 170, and the fields of color 170 may be arranged in a sequence of different colors which follows the color spectrum, the sequence corresponding to any of the folding or unfolding sequences set forth above. In this manner, a child is exposed to a full spectrum of colors and is taught the placement of each color within the order of colors in the color spectrum, while folding or unfolding panels 40, as described above.

Various other arrangements of characters, symbols, colors, pictorial representations and the like are available for placement upon the plurality of surfaces 160 provided by the extended number of panels 40 in each blank 20 for games, puzzles and other amusements, as well as for imparting basic knowledge and teaching basic skills.

It will be seen that the present invention attains all of the objects and advantages summarized above, namely: Provides a box-like toy having a simple construction which is highly effective in imparting to children basic knowledge and teaching children basic skills; encourages children to use their own imagination in manipulating a structural arrangement of minimal complexity to derive information and skills; maintains a child's interest while the child gains basic information and skills; caters to a child's fascination with simple structures to impart knowledge and skills through ready manipulation of such simple structures; provides an educational toy of simple design and construction, readily manufactured of relatively inexpensive materials for economy and widespread acceptance and use.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. An educational box toy for teaching one or more of the alphabet, numbers, colors, spacial problem solving and hand-eye coordination, the box toy comprising:
   a series of blanks constructed of sheet material, the blanks being dimensioned and configured for selective erection by folding into a corresponding series of box-like members, each box-like member having six faces, each blank comprising nine panels, including:
   four first panels aligned along a longitudinal row having longitudinally opposite ends, the first panels including an end panel adjacent each end of the row, intermediate panels between the end panels, a bottom edge, a top edge laterally opposite the bottom edge, and first fold lines between corresponding adjacent first panels for enabling folding of the first panels into corresponding four sides of a corresponding box-like member;
   a first additional panel extending from one of the first panels, and a first additional fold line between the first additional panel and the one first panel for enabling folding of the first additional panel into overlapping juxtaposition with a first panel;
   a second panel extending in a first lateral direction from the bottom edge of the longitudinal row of first panels, adjacent a first panel, and a second fold line between the second panel and the adjacent first panel for enabling folding of the second panel into a bottom of the corresponding box-like member;
   a second additional panel extending in the first lateral direction from the bottom edge of the longitudinal row of first panels, adjacent a first panel, and a second additional fold line between the second additional panel and the adjacent a first panel for enabling folding of the second additional panel into overlapping juxtaposition with the second panel;
   a securing arrangement for securing the second additional panel in the overlapping juxtaposition with the second panel;
   a third panel extending in a second lateral direction, opposite to the first lateral direction, from the top edge of the longitudinal row of first panels, adjacent a first panel, and a third fold line between the third panel and the adjacent first panel for enabling folding of the third panel into a top of the corresponding box-like member;
   a third additional panel extending in the second lateral direction, opposite to the first lateral direction, from the top edge of the longitudinal row of first panels, adjacent a first panel, and a third additional fold line between the third additional panel and the adjacent a first panel for enabling folding of the third additional panel into overlapping juxtaposition with the third panel; and
   a further securing arrangement for securing the third additional panel in the overlapping juxtaposition with the third panel;
   the series of blanks being dimensioned and configured such that each consecutive box-like member of the series of box-like members is smaller than and receivable within a larger next consecutive box-like member of the series of box-like members for enabling the box-like members of the series to be assembled into a nested arrangement of box-like members.

2. The educational box toy of claim 1 wherein the first additional panel extends in a longitudinal direction from an end panel.

3. The educational box toy of claim 1 wherein the second panel extends from an end panel.

4. The educational box toy of claim 1 wherein the third panel extends from an end panel.

5. The educational box toy of claim 1 wherein the second panel and the third panel extend from a common first panel.

6. The educational box toy of claim 5 wherein the common first panel is an end panel.

7. The educational box toy of claim 1 wherein the second additional panel extends from an end panel.

8. The educational box toy of claim 1 wherein the third additional panel extends from an end panel.

9. The educational box toy of claim 1 wherein the second additional panel and the third additional panel extend from a common first panel.

10. The educational box toy of claim 9 wherein the common first panel is an end panel.

11. The educational box toy of claim 10 wherein the first additional panel extends in a longitudinal direction from the common first panel.

12. The educational box toy of claim 1 wherein the second panel and the third panel extend from the one of the end panels, and the second additional panel and the third additional panel extend from the other of the end panels.

13. The educational box toy of claim 12 wherein the first additional panel extends in a longitudinal direction from the other of the end panels.

14. The educational box toy of claim 1 wherein the series of blanks comprises four blanks providing a total of thirty-six panels for displaying one alpha-numeric character on each panel, the alpha-numeric characters comprising the twenty-six characters of the English alphabet and the numerical characters 1 through 10.

15. The educational box toy of claim 14 wherein the alpha-numeric characters are placed on the panels in an arrangement for viewing the characters in a desired learning sequence.

16. The educational box toy of claim 15 wherein the arrangement is such that the desired learning sequence corresponds to a predetermined alphabetical and numerical sequence as the panels are folded in a prescribed sequence to erect each blank into a corresponding box-like member.

17. A method for teaching one or more of the alphabet, numbers, colors, spacial problem solving and hand-eye coordination, the method comprising:
   providing an educational box toy constructed in accordance with claim 16; and
   folding the panels to erect each blank into a corresponding box-like member.

18. The method of claim 17 including assembling the box-like members into a nested arrangement.

19. The educational box toy of claim 15 wherein the arrangement is such that the desired learning sequence corresponds to a predetermined alphabetical and numerical sequence as the panels of erected box-like members are unfolded in a prescribed sequence.

20. A method for teaching one or more of the alphabet, numbers, colors, spacial problem solving and hand-eye coordination, the method comprising:
   providing an educational box toy constructed in accordance with claim 19; and
   unfolding the panels of each box-like member in the prescribed sequence.

21. An educational box toy for teaching basic knowledge and skills, the box toy comprising:

a blank constructed of sheet material, the blank being dimensioned and configured for selective erection by folding into a corresponding box-like member having six faces, the blank comprising nine panels, including:
   four first panels aligned along a longitudinal row having longitudinally opposite ends, the first panels including end panels, with an end panel adjacent each end of the row, intermediate panels between the end panels, a bottom edge, a top edge laterally opposite the top edge, and first fold lines between corresponding adjacent first panels for enabling folding of the first panels into corresponding four sides of a corresponding box-like member;
   a first additional panel extending from one of the first panels, and a first additional fold line between the first additional panel and the one first panel for enabling folding of the first additional panel into overlapping juxtaposition with a first panel;
   a second panel extending in a first lateral direction from the bottom edge of the longitudinal row of first panels, adjacent a first panel, and a second fold line between the second panel and the adjacent first panel for enabling folding of the second panel into a bottom of the corresponding box-like member;
   a second additional panel extending in the first lateral direction from the bottom edge of the longitudinal row of first panels, adjacent another first panel, and a second additional fold line between the second additional panel and the adjacent another first panel for enabling folding of the second additional panel into overlapping juxtaposition with the second panel;
   a securing arrangement for securing the second additional panel in the overlapping juxtaposition with the second panel;
   a third panel extending in a second lateral direction, opposite to the first lateral direction, from the top edge of the longitudinal row of first panels, adjacent a first panel, and a third fold line between the third panel and the adjacent first panel for enabling folding of the third panel into a top of the corresponding box-like member;
   a third additional panel extending in the second lateral direction, opposite to the first lateral direction, from the top edge of the longitudinal row of first panels, adjacent a first panel, and a third additional fold line between the third additional panel and the adjacent first panel for enabling folding of the third additional panel into overlapping juxtaposition with the third panel; and
   a further securing arrangement for securing the third additional panel in the overlapping juxtaposition with the third panel.

22. The educational box toy of claim 21 wherein the first additional panel extends in a longitudinal direction from an end panel.

23. The educational box toy of claim 21 wherein the second panel extends from an end panel.

24. The educational box toy of claim 21 wherein the third panel extends from an end panel.

25. The educational box toy of claim 21 wherein the second panel and the third panel extend from a common first panel.

26. The educational box toy of claim 25 wherein the common first panel is an end panel.

27. The educational box toy of claim 21 wherein the second additional panel extends from an end panel.

28. The educational box toy of claim 21 wherein the third additional panel extends from an end panel.

29. The educational box toy of claim 21 wherein the second additional panel and the third additional panel extend from a common first panel.

30. The educational box toy of claim 29 wherein the common first panel is an end panel.

31. The educational box toy of claim 30 wherein the first additional panel extends in a longitudinal direction from the common first panel.

32. The educational box toy of claim 21 wherein the second panel and the third panel extend from the one of the end panels, and the second additional panel and the third additional panel extend from the other of the end panels.

33. The educational box toy of claim 32 wherein the first additional panel extends in a longitudinal direction from the other of the end panels.

34. The educational box toy of claim 21 wherein characters are placed on the panels in an arrangement for viewing the characters in a desired learning sequence.

35. The educational box toy of claim 34 wherein the arrangement is such that the desired learning sequence corresponds to a predetermined sequence of characters as the panels are folded in a prescribed sequence for erecting the blank into a corresponding box-like member.

36. A method for teaching basic knowledge and skills, the method comprising:
   providing an educational box toy constructed in accordance with claim 35; and
   folding the panels to erect the blank into a corresponding box-like member.

37. The educational box toy of claim 34 wherein the arrangement is such that the desired learning sequence corresponds to a predetermined sequence of characters as the panels of an erected box-like member are unfolded in a prescribed sequence.

38. A method for teaching basic knowledge and skills, the method comprising:
   providing an educational box toy constructed in accordance with claim 37; and
   unfolding the panels of the box-like member in the prescribed sequence.

* * * * *